US008667416B2

(12) United States Patent
England et al.

(10) Patent No.: US 8,667,416 B2
(45) Date of Patent: Mar. 4, 2014

(54) USER INTERFACE MANIPULATION FOR COHERENT CONTENT PRESENTATION (75) Inventors: Laurence England, Morgan Hill, CA (US); Chenhong Xia, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 593 days.

(21) Appl. No.: 12/758,498

(22) Filed: Apr. 12, 2010

(65) Prior Publication Data
US 2011/0252359 A1    Oct. 13, 2011

(51) Int. Cl.
*G06F 3/048*    (2013.01)
(52) U.S. Cl.
USPC ............................ 715/781; 715/803; 715/804
(58) Field of Classification Search
None
See application file for complete search history.

(56) References Cited

U.S. PATENT DOCUMENTS

| | | |
|---|---|---|
| 5,801,699 A | 9/1998 | Hocker et al. |
| 5,808,610 A | 9/1998 | Benson et al. |
| 6,075,531 A | 6/2000 | DeStefano |
| 6,714,222 B1* | 3/2004 | Bjorn et al. ................... 715/839 |
| 7,487,465 B2 | 2/2009 | Haynes et al. |
| 2004/0027350 A1 | 2/2004 | Kincaid et al. |
| 2005/0289478 A1 | 12/2005 | Landman et al. |
| 2006/0161860 A1* | 7/2006 | Holecek et al. ............... 715/781 |
| 2006/0174214 A1* | 8/2006 | McKee et al. ................. 715/802 |
| 2007/0174079 A1* | 7/2007 | Kraus .................................. 705/1 |
| 2009/0064035 A1* | 3/2009 | Shibata et al. ................ 715/803 |
| 2009/0193358 A1 | 7/2009 | Mernyk et al. |
| 2010/0250479 A1* | 9/2010 | Carter ............................. 706/46 |

* cited by examiner

*Primary Examiner* — Tuyetlien Tran
*Assistant Examiner* — Stella Eun
(74) *Attorney, Agent, or Firm* — DeLizio Gilliam, PLLC (57) ABSTRACT

Functionality is implemented to determine that a first content presented by a first graphical user interface container is related to a second content presented by a second graphical user interface container. The first graphical user interface container and the second graphical user interface container are merged to generate a merged container that presents a merged content. The merged content comprises a first constituent content of the merged container that corresponds to the first content and a second constituent content of the merged container that corresponds to the second content. It is determined that a first action associated with the first constituent content can operate upon the second constituent content. The first action operates on the first constituent content when invoked. Computer program code that implements the first action is reconfigured to operate upon the first and the second constituent content of the merged container.

19 Claims, 7 Drawing Sheets

USER INTERFACE MANIPULATION FOR COHERENT CONTENT PRESENTATION

BACKGROUND

Embodiments of the inventive subject matter generally relate to the field of user interfaces and, more particularly, to techniques for user interface manipulation for coherent content presentation.

An application's graphical user interface (GUI) typically includes containers. A GUI container may be a panel, a frame, or a dialog box, etc., which displays content (e.g., text, images, animation, and video). A user can visually inspect the content displayed by the GUI containers, identify the GUI containers with similar or related content in the user's opinion, and direct the application to merge the identified GUI containers for better navigation across related content presented by the GUI containers.

SUMMARY

Embodiments include a method comprising determining that a first content presented by a first graphical user interface container is related to a second content presented by a second graphical user interface container. The first graphical user interface container and the second graphical user interface container are merged to generate a merged container that presents a merged content based, at least in part, on determining that the first content presented by the first graphical user interface container is related to the second content presented by the second graphical user interface container. The merged content comprises a first constituent content of the merged container that corresponds to the first content and a second constituent content of the merged container that corresponds to the second content. It is determined that a first action associated with the first constituent content can operate upon the second constituent content, wherein the first action operates on the first constituent content when invoked. Computer program code that implements the first action is reconfigured to operate upon the first and the second constituent content of the merged container responsive to determining that the first action associated with the first constituent content can operate upon the second constituent content.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, although examples refer to operations for merging two GUI containers, in other implementations, any suitable number of GUI containers can be merged. Moreover, although examples refer to merging GUI containers displayed by a single application, operations for identifying and merging related GUI containers can also be applied to GUI containers across a plurality of applications. In other instances, well-known instruction instances, protocols, structures, and techniques have not been shown in detail in order not to obfuscate the description.

Some graphical user interfaces display content across multiple GUI containers (e.g., windows, panels, views, layers, etc.), thus fragmenting the content across the multiple GUI containers. Displaying content in a large number of GUI containers can make it difficult for users to navigate through the content fragmented across the large number of GUI containers. A user can manually inspect content displayed across multiple GUI containers and can identify the GUI containers with similar/related content (e.g., content that addresses a common subject, etc.). The user can provide user input (e.g., drag a GUI container to touch or overlap another GUI container) to merge the GUI containers with the perceived related content. However, relying on the user's ability to identify the GUI containers with the related content can result in a hit or a miss because the user may overlook relationships between content displayed by the GUI containers. Also, because the volume of data to be analyzed for identifying the GUI containers to be merged may be large, manual analysis of metadata/content associated with the GUI containers may be a time-intensive and a labor-intensive task. Connecting or merging GUI containers that display related content can enable the users to navigate content displayed by the merged GUI container as a single unit.

An executing instance of code (i.e., a process) can intelligently identify GUI containers with related content, and automatically merge those GUI containers. A GUI analysis and merging unit identifies the GUI containers with the related content based on analyzing metadata associated with each of the GUI containers. In the absence of metadata, the GUI analysis and merging unit can analyze the content displayed by the GUI containers and can identify GUI containers with related content based on the content analysis. The GUI analysis and merging unit can also notify a user of the GUI containers that can be merged. The GUI analysis and merging unit can merge the GUI containers to generate a merged GUI container. The merged GUI container presents content formerly presented by each individual GUI container that was merged to form the merged GUI container. The content, presented by the merged GUI container, that was formerly displayed by an individual GUI container is referred to herein as constituent content of the merged GUI container. The GUI analysis and merging unit can also analyze actions individually associated with each constituent content of the merged GUI container. The GUI analysis and merging unit identifies an action that can be extended to operate on other constituent content of the merged GUI container (i.e., content displayed by the merged GUI container not originally associated with the action). Automating the process of identifying GUI containers with related content, merging those GUI containers, and merging appropriate actions can also be extended to webpage/software designing applications. This can free programmers from the burden of having prior knowledge of a webpage's layout (e.g., how the webpage is to be partitioned, a number of panels on the webpage, a position of the panels on the webpage, content displayed by each of the panels, etc.) and the burden of manually identifying GUI containers that should be placed on a webpage. This can reduce the effort expended in creating webpages, creating software applications, navigating content, etc.

Figure 1:
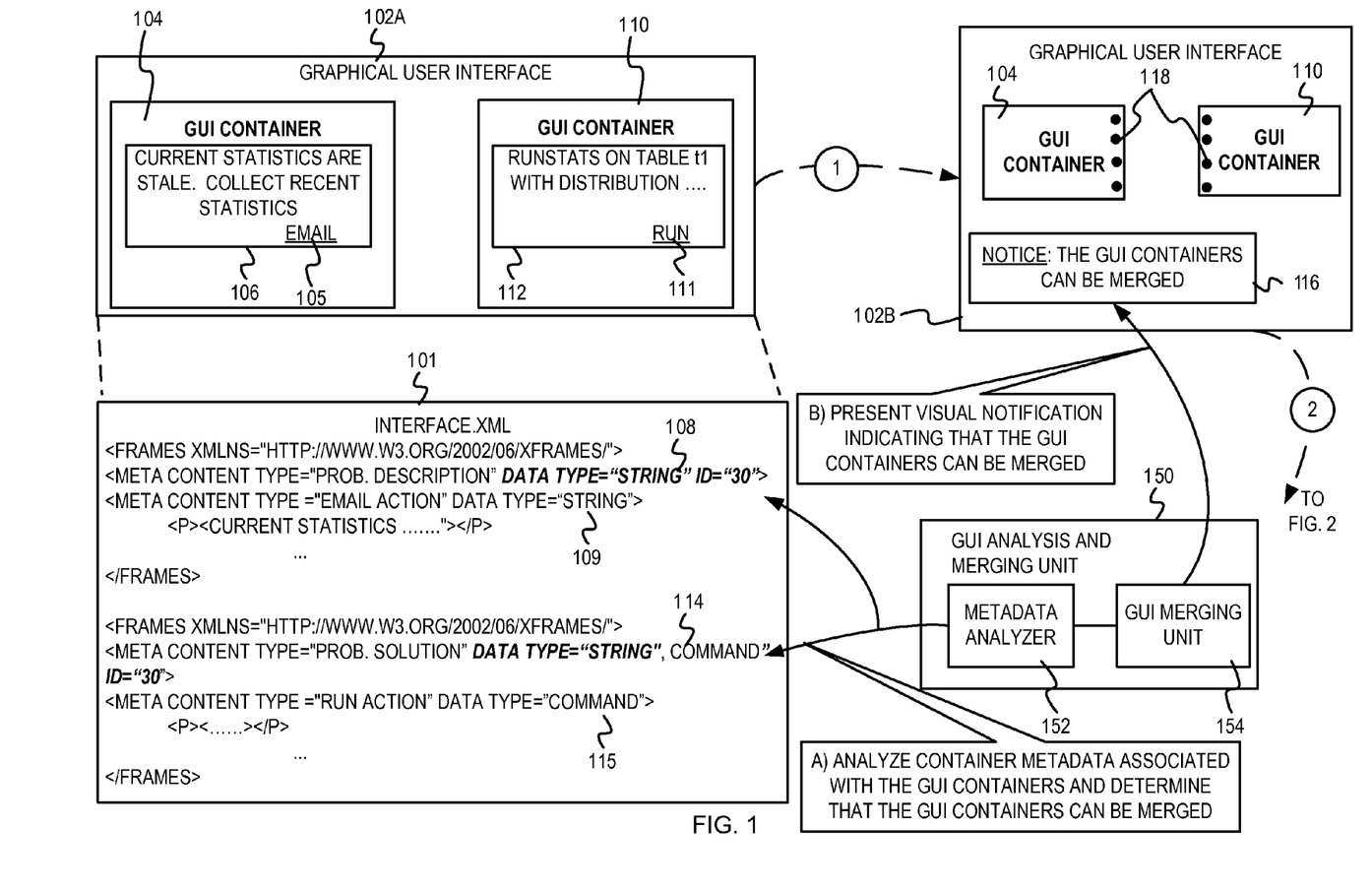
FIG. 1 depicts an example conceptual diagram illustrating operations for dynamically identifying GUI containers that can be merged.
Figure 2:
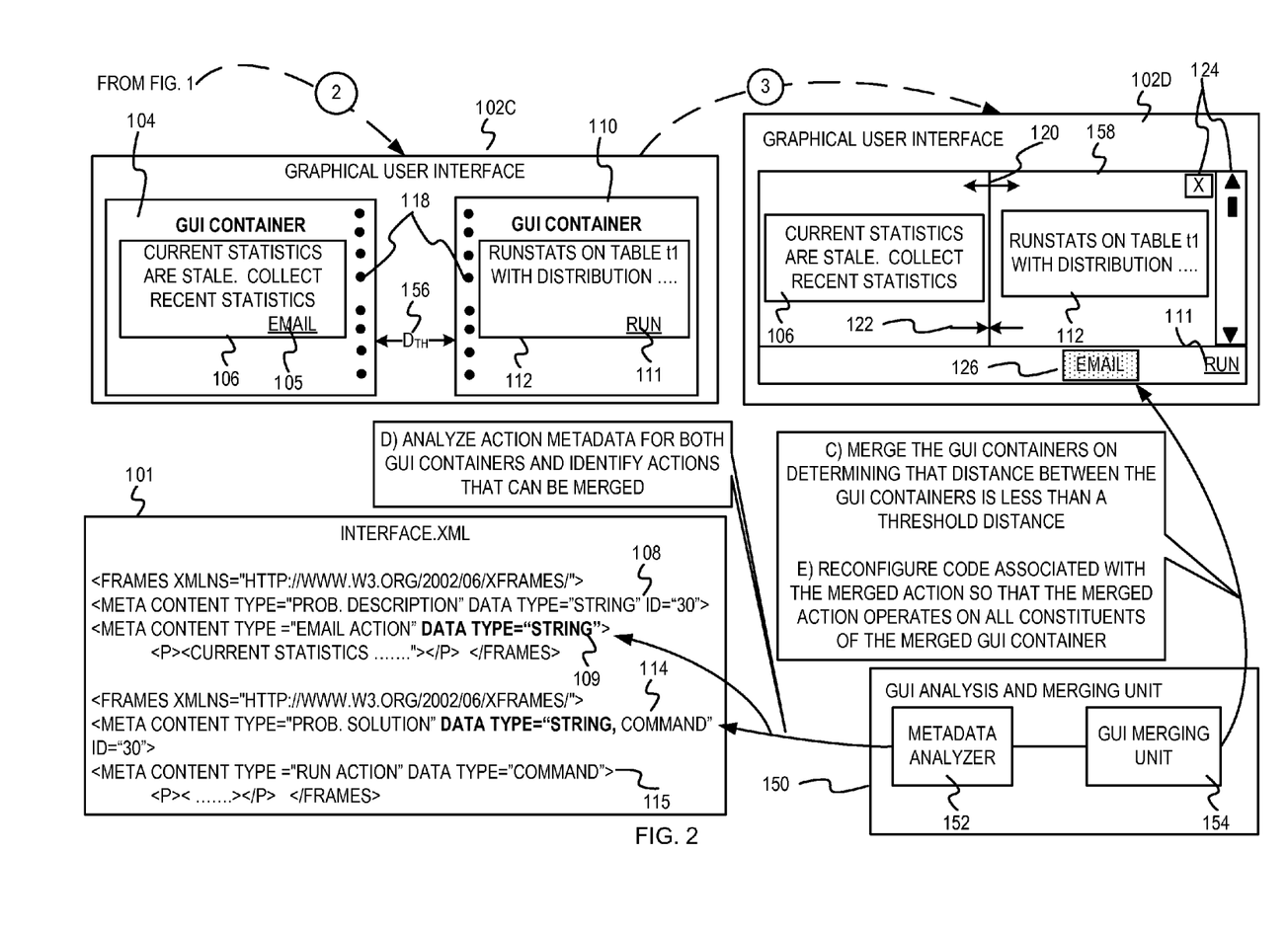
FIG. 2 depicts the example conceptual diagram illustrating operations for dynamically identifying GUI containers that can be merged.

FIG. 1 and FIG. 2 depict conceptual diagrams illustrating example operations for dynamically identifying GUI containers that can be merged. FIG. 1 depicts a graphical user interface 102A. Responsive to execution of code 101, an application (not shown) generates the graphical user interface 102A. The code 101 may be part of the application (e.g., part of code for performing functions of the application) and may be executed on detecting a request to launch the graphical user interface 102A. In some implementations, the code 101 may be distinct from the application and may be invoked either while the application is being launched or after the application is launched. The graphical user interface 102A presents two GUI containers—a GUI container 104 and a GUI container 110 responsive to execution of the code 101. In some implementations, the application may display the GUI containers 104 and 110 responsive to detecting a user input (e.g., a user clicking on links to display the GUI containers 104 and 110) on the graphical user interface 102A. The GUI container 104 displays content 106 and a link 105 to perform an email action ("email action link") that operates on the content 106 when invoked. As depicted in the code 101, the content 106 is associated with content metadata 108 which describe content of the GUI container 104. The email action link 105 is associated with action metadata 109 which describe functionality of the email action. The GUI container 110 displays content 112 and a link to perform a run action 111 ("run action link") that operates on the content 112 when invoked. As depicted in the code 101, the content 112 is associated with content metadata 114 which describe content of the GUI container 110. The run action link 111 is associated with action metadata 115 which describe functionality of the run action. It should be noted that in some implementations, various other GUI elements may be used to indicate actions (e.g., functionality that operates on, processes, or transforms the content) that operate on the content. For example, the actions may be represented as buttons, in drop down menus, etc.

FIG. 1 also depicts a GUI analysis and merging unit 150. The GUI analysis and merging unit 150 comprises a metadata analyzer 152 coupled with a GUI merging unit 154. The GUI analysis and merging unit 150 implements functionality for identifying GUI containers with at least a threshold degree of similarity and merging the identified GUI containers and actions (if possible) associated with the identified GUI containers responsive to user inputs. This is further described in stages A-E.

The GUI analysis and merging unit 150 first identifies the GUI containers 104 and 110 that are displayed by the graphical user interface 102A. The GUI analysis and merging unit 150 may receive a notification from the application that generated the graphical user interface 102A. It should be noted that embodiments are not limited to employing a notification mechanism for identifying the GUI containers displayed by graphical user interface 102A. For example, the GUI analysis and merging unit 150 may monitor user actions (e.g., may determine a selection of links/buttons on the graphical user interface 102A), may intercept requests to display the GUI container, etc.

At stage A, the metadata analyzer 152 in the GUI analysis and merging unit 150 analyses the content metadata 108 and the content metadata 114 respectively associated with the GUI container 104 and the GUI container 110. The metadata analyzer 152 reads and analyses the content metadata 108 and the content metadata 114 from the code 101. Based on analyzing the content metadata 108 and the content metadata 114, the metadata analyzer 152 determines that the GUI containers 104 and 110 can be merged. As depicted by the code 101, the content metadata 108 for the content 106 displayed by the GUI container 104 indicate that the content 106 is a problem description for a problem with an identifier 30 and that the GUI container 104 comprises String content. The content metadata 114 for the content 112 displayed by the GUI container 110 indicate that the content 112 is a problem solution for resolving a problem with an identifier 30 and that the GUI container 110 also comprises String content. The metadata 114 also indicates that the content 112 is a command. The metadata analyzer 152 analyses the metadata 108 and 114 and determines that the content 106 and the content 112 are Strings and that the content 106 and 112 are both associated with the problem with identifier 30". Thus, the metadata analyzer 152 determines that the GUI containers 104 and 110 comprise related content. It is noted that the metadata analyzer 152 may access a set of rules (e.g., in a rule engine or in the metadata analyzer 152) to determine whether the GUI containers 104 and 110 comprise related content. For example, the rules may indicate that GUI containers that comprise content associated with a common problem identifier can be merged. As another example, the rules may indicate that a GUI container comprising "problem description" content can be merged with a GUI container comprising "problem solution" content if the content is directed to a problem with a common identifier. For illustrative purposes, the text "data type="String"" and the text "id="30"" in the code 101 is italicized and in bold font to indicate that the GUI containers 104 and 110 comprise content that addresses a common issue and that the GUI containers 104 and 110 can therefore be merged.

At stage B, the GUI merging unit 154 presents a visual notification indicating that the GUI containers 104 and 110 can be merged. A dashed line denoted by "1" from the graphical user interface 102A to a graphical user interface 102B indicates a transition in the graphical user interface on determining that the GUI containers 104 and 110 can be merged. As depicted by the graphical user interface 102B, the GUI merging unit 154 presents a notification 116 that indicates the GUI containers 104 and 110 can be merged. On the graphical user interface 102B, the GUI merging unit 154 displays dots 118, which could have color(s), on neighboring edges of the GUI containers 104 and 110 to indicate that the GUI containers 104 and 110 can be merged. Embodiments can employ a variety of techniques to communicate the capacity to merge GUI containers. Example techniques include varying visual elements (e.g., colors of content displayed by the GUI containers, fonts of content displayed by the GUI containers, and/or thickness of borders of GUI containers), presenting other elements (e.g., lines that connect GUI containers), presenting audio cues, etc. A dashed line denoted by "2" illustrates a transition from the graphical user interface 102B to a graphical user interface 102C in FIG. 2.

At stage C in FIG. 2, the GUI merging unit 154 merges the GUI containers 104 and 110 on determining that a distance between the GUI containers 104 and 110 is less than a threshold distance 156. The GUI merging unit 154 may merge the GUI containers 104 and 110 responsive to a user input indicating that the GUI containers 104 and 110 should be merged. For example, the GUI merging unit 154 detects a selection of the GUI container 104 and determines that the GUI container 104 is being moved towards the GUI container 110. As depicted by the graphical user interface 102C, the GUI merging unit 154 determines that the distance between the GUI containers 104 and 110 is less than or equal to the threshold distance 156. In some implementations, the GUI merging unit 154 may vary the visual indications presented at stage B depending on the distance between the GUI containers 104 and 110. For example, as the distance between the GUI containers 104 and 110 decreases, the GUI merging unit 154 can increase the brightness of the dots 118, can increase thickness of lines that connect the GUI containers, can increase intensity of audio cues, etc. Embodiments can employ various other techniques to request/receive user input that indicates whether or not the GUI containers should be merged. Example techniques include displaying clickable notifications (e.g., a notification that indicates the GUI containers that can be merged and that asks the user to click on a "yes" or a "no" link), displaying instructions for merging the GUI containers, etc. In some implementations, on determining that the GUI containers 104 and 110 can be merged, the GUI merging unit 154 can automatically merge the GUI containers 104 and 110 without requiring user intervention.

The GUI merging unit 154 merges the GUI containers 104 and 110 to generate a merged GUI container. A dashed line denoted by "3" illustrates a transition from the graphical user interface 102C to a graphical user interface 102D. On the graphical user interface 102D, the GUI merging unit 154 merges the GUI containers 104 and 110 to generate the merged GUI container 158. The merged GUI container 158 displays merged content. The merged content comprises two or more constituent content and each constituent content of the merged GUI container corresponds to content of a GUI container that was merged to generate the merged GUI container 158. The content 106 and 112 displayed respectively by the GUI containers 104 and 110 are merged on the graphical user interface 102D to form the merged content. The content 106 is a first constituent content of the merged GUI container 158 and the content 112 is a second constituent content of the merged GUI container 158.

At stage D, the metadata analyzer 152 analyses the action metadata 109 and 115 respectively associated with the email action link 105 and the run action link 111, and identifies actions that can be merged. The metadata analyzer 152 may automatically identify the actions that can be merged or may identify the actions that can be merged responsive to the user indicating whether the actions that operate on each constituent content of the merged GUI container should be merged (if possible). The action metadata 109 and 115 respectively describe functionality of the email action and the run action and may also indicate types of data on which the actions can operate. The metadata analyzer 152 can compare the action metadata 109 and 115 with the content metadata 108 and 114, and identify common words, phrases, combination of alphanumeric characters, symbols, etc. In some implementations, in comparing the metadata, the metadata analyzer 152 may ignore prepositions, conjunctions, articles, etc. The metadata analyzer 152 can then determine whether the email action and the run action can be associated with the constituent content 106 and 112 of the merged GUI container 158. As depicted by the code 101, the action metadata 109 indicates that the email action operates on content with a data type "String". The action metadata 114 indicates that the run action only executes commands. For clarity, in the code 101 in FIG. 2, the common words that indicate a relationship between the content metadata 108 and 114 and the action metadata 109 and 115 are depicted in a bold font. The metadata analyzer 152 compares the action metadata 109 for the email action link 105 with the content metadata 114 associated with the second constituent content 112 of the merged GUI container 158 and identifies common words. The metadata analyzer 152 determines, based on the action metadata 109, that the email action operates on any String content. The metadata analyzer 152 also determines, based on the content metadata 114, that the content 112 is a String. Based on such analysis, the metadata analyzer 152 determines that the email action link 105 can be associated with both constituent content 106 and 112 of the merged GUI container 158. Likewise, the metadata analyzer 152 compares the action metadata 115 for the run action link 111 with the content metadata 108 associated with the first constituent content 106 of the merged GUI container 158. The metadata analyzer 152 determines, based on the action metadata 115, that the run action executes commands. The metadata analyzer 152 determines, based on the content metadata 108, that the content 106 is a String. Therefore, the metadata analyzer 152 determines that there are no similarities between the content metadata 108 and the action metadata 115. Consequently, the metadata analyzer 152 determines that the run action link 111 cannot be associated with the constituent content 106 of the merged GUI container 158. In some implementations, the metadata analyzer 152 may access the set of rules to determine whether the email action and the run action can also be merged. For example, the rules may indicate that the email action can operate on any String content. The metadata analyzer 152 may determine, based on the content metadata 108 and 114, that the first and the second constituent content of the merged GUI container 158 comprise String content. Accordingly, the metadata analyzer 152 may determine that the email action link 105 can be reconfigured to operate on the first and the second constituent content of the merged GUI container 158. It is noted that the email action is not limited to emailing String content. The email action can also operate on other non-String content (e.g., images).

At stage E, the GUI merging unit 154 reconfigures code associated with the merged action so that the merged action operates on both of the constituent content 106 and 112 of the merged GUI container 158. The GUI merging unit 154 may redefine objects/parameters in the code, disable existing code associated with the action, and generate new code that enables the merged action to operate on the constituent content 106 and 112 of the merged GUI container 158. As described with reference to stage D, the metadata analyzer 152 determines that the email action can operate on both the constituent content 106 and 112 of the merged GUI container 158 and is therefore a merged action. The metadata analyzer 152 also determines that the run action cannot operate on both the constituent content 106 and 112 of the merged GUI container 158 and is therefore not a merged action. The GUI merging unit 154 may reconfigure the code associated with the email action link 105 to generate the email action link 126. Thus, when the email action represented by the link 126 is invoked (e.g., when the user clicks on the link 126), the email action operates on both the constituent content 106 and 112 of the merged GUI container 158. As depicted by the graphical user interface 102D, the GUI merging unit 154 visually depicts whether or not the actions are merged actions. For example, the email action link 126 on the graphical user interface 102D is enclosed by a shaded box to indicate that the email action represented by the link 126 is a merged action and is associated with both the constituent content 106 and 112 of the merged GUI container 158. The run action link 111 on the graphical user interface 102D is not reconfigured because the run action only operates on the constituent content 112 of the merged GUI container 158. The run action link 111 on the graphical user interface 102D is underlined to indicate that the run action is not a merged action. It should be noted, however, that the GUI merging unit 154 could use any suitable visual indications (e.g., presenting notifications when a mouse pointer or other selection tool hovers over an action link, etc.) to distinguish between the merged actions and non-merged actions. The GUI merging unit 154 may also use audio indications (e.g., playing different audio tones based on whether a merged action or a non-merged action is selected) to distinguish between the merged actions and non-merged actions. In some implementations, the GUI merging unit 154 may not present any indications to distinguish between the merged actions and non-merged actions. On the graphical user interface 102D, the GUI merging unit 154 also presents a common navigation mechanism 124 for navigating the constituent content 106 and 112 of the merged GUI container 158. For example, clicking on a scroll bar navigation button results in the constituent content 106 and 112 of the merged GUI container 158 being scrolled simultaneously. Likewise, clicking on a common "close window" button results in the constituent content 106 and 112 of the merged GUI container 158 being closed.

In some implementations, the GUI merging unit 154 may also present the user with an option for permanently merging the constituent content 106 and 112 of the merged GUI container 158. As depicted by the graphical user interface 102D, the GUI merging unit 154 presents arrows 120 for disassociating the constituent content 106 and 112 of the merged GUI container 158. Disassociating the constituent content 106 and 112 of the merged GUI container 158 can also result in the merged action represented by the link 126 being no longer associated with both the constituent content 106 and 112 of the merged GUI container 158. In other words, on clicking the arrows 120 to disassociate the constituent content 106 and 112 of the merged GUI container 158, the GUI merging unit 154 generates the GUI containers 104 and 110 with their respective content 106 and 112 and their respective action links 105 and 111. The GUI merging unit 154 also presents arrows 122 for permanently merging the constituent content 106 and 112 of the merged GUI container 158. Responsive to clicking on the arrows 122 to permanently merge the constituent content 106 and 112 of the merged GUI container 158, the GUI merging unit 154 removes the ability to disassociate the constituent content 106 and 112 of the merged GUI container 158. For example, responsive to clicking on the arrows 122, the GUI merging unit 154 may disable code associated with generating the GUI containers 104 and 110 with their respective content 106 and 112 and their respective actions from the merged GUI container 158. The GUI merging unit 154 may redefine objects in the code 101, remove elements (e.g., the arrows 120) on the merged GUI container for separating the constituent content of the merged GUI container 158, etc. In some implementations, the GUI merging unit 154 may also reconfigure code associated with presenting the merged GUI container 158 so that the constituent content 106 and 112 of the merged GUI container 158 are presented in a single GUI container (e.g., presenting the constituent content of the merged GUI container on a single panel/textbox as opposed to contiguously placing the constituent content 106 and 112 of the merged GUI container 158). Operations for executing merged actions are further described by stages F-H in FIG. 3.

Figure 3:
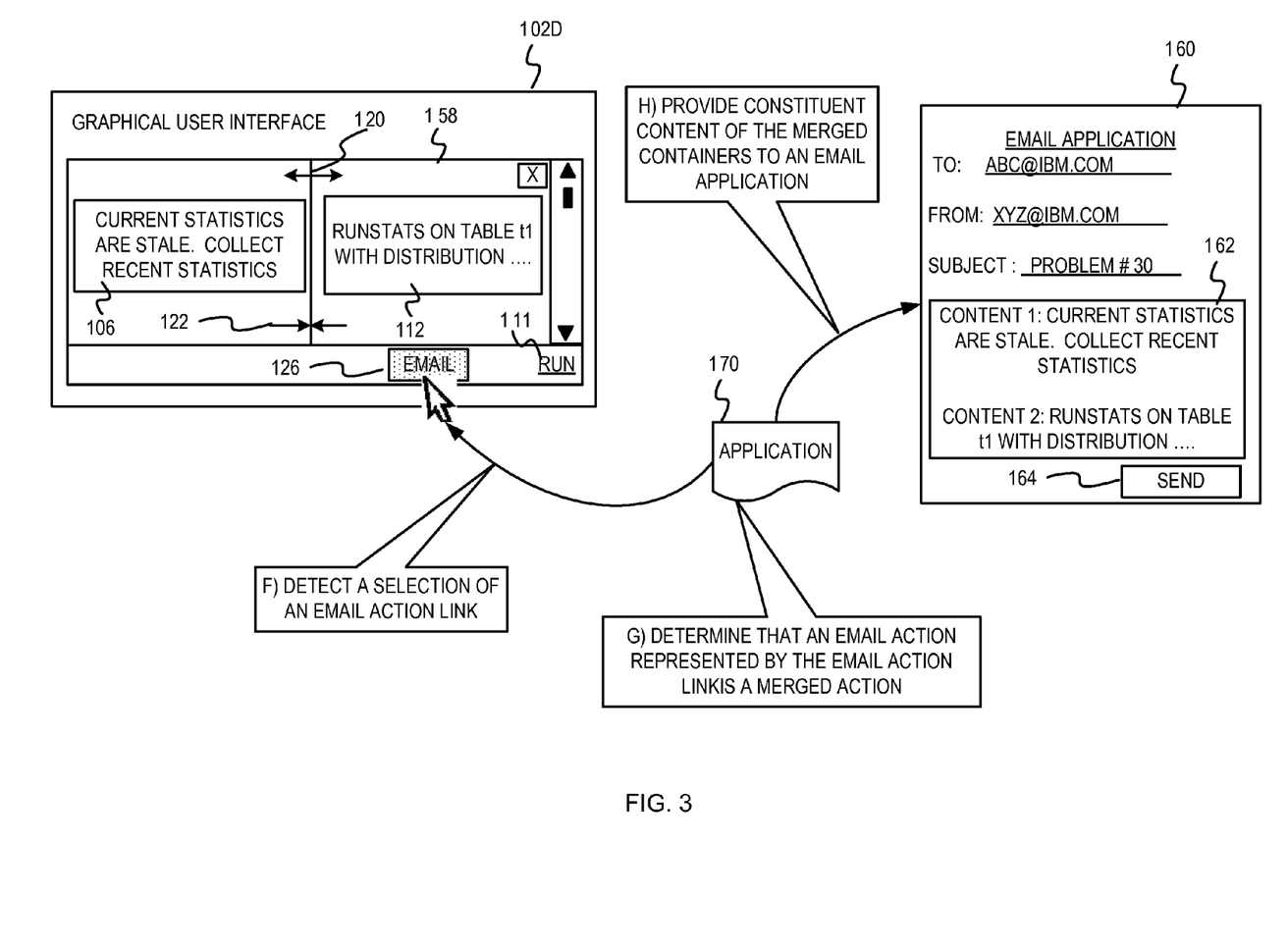
FIG. 3 depicts an example conceptual diagram illustrating executing merged actions.

At stage F, a selection of the email action link 126 is detected. In FIG. 3, the application 170 detects the selection (via a mouse click, a keyboard press, an audio input, etc.) of the email action link 126.

At stage G, the application 170 determines that the email action represented by the link 126 is a merged action. In one implementation, the GUI analysis and merging unit 150 may transmit a notification, to the application 170, indicating the constituent content 106 and 112 of the merged GUI container 158, the merged actions, the non-merged actions, etc. The application 170 may access a table comprising a list of merged actions and constituent content of the merged GUI container 158 to determine whether the email action represented by the link 126 is a merged action. In another implementation, the GUI analysis and merging unit 150 may populate a table to keep track of the constituent content 106 and 112 of the merged GUI container 158, the merged actions, the non-merged actions, etc. Responsive to detecting the selection of the email action link 126, the application 170 may query the GUI analysis and merging unit 150 to determine whether the email action represented by the link 126 is a merged action. It should be noted, however, that in some implementations, the application 170 might not determine whether or not the email action is a merged action. Instead, the application 170 may execute a segment of code that corresponds to the selection of the email action link 126. The segment of code that corresponds to the selection of the email action link 126 may be reconfigured (as described at stage E) to operate on the constituent content 106 and 112 of the merged GUI container 158.

At stage H, the application 170 provides the constituent content 106 and 112 of the merged GUI container 158. The application 170 retrieves the constituent content 106 and 112 and provides the constituent content 106 and 112 to an email application 160. In FIG. 3, the body 162 of the email comprises the constituent content 106 and 112 of the merged GUI container 158. The user clicks on a send button 164 to send the email.

Figure 4:
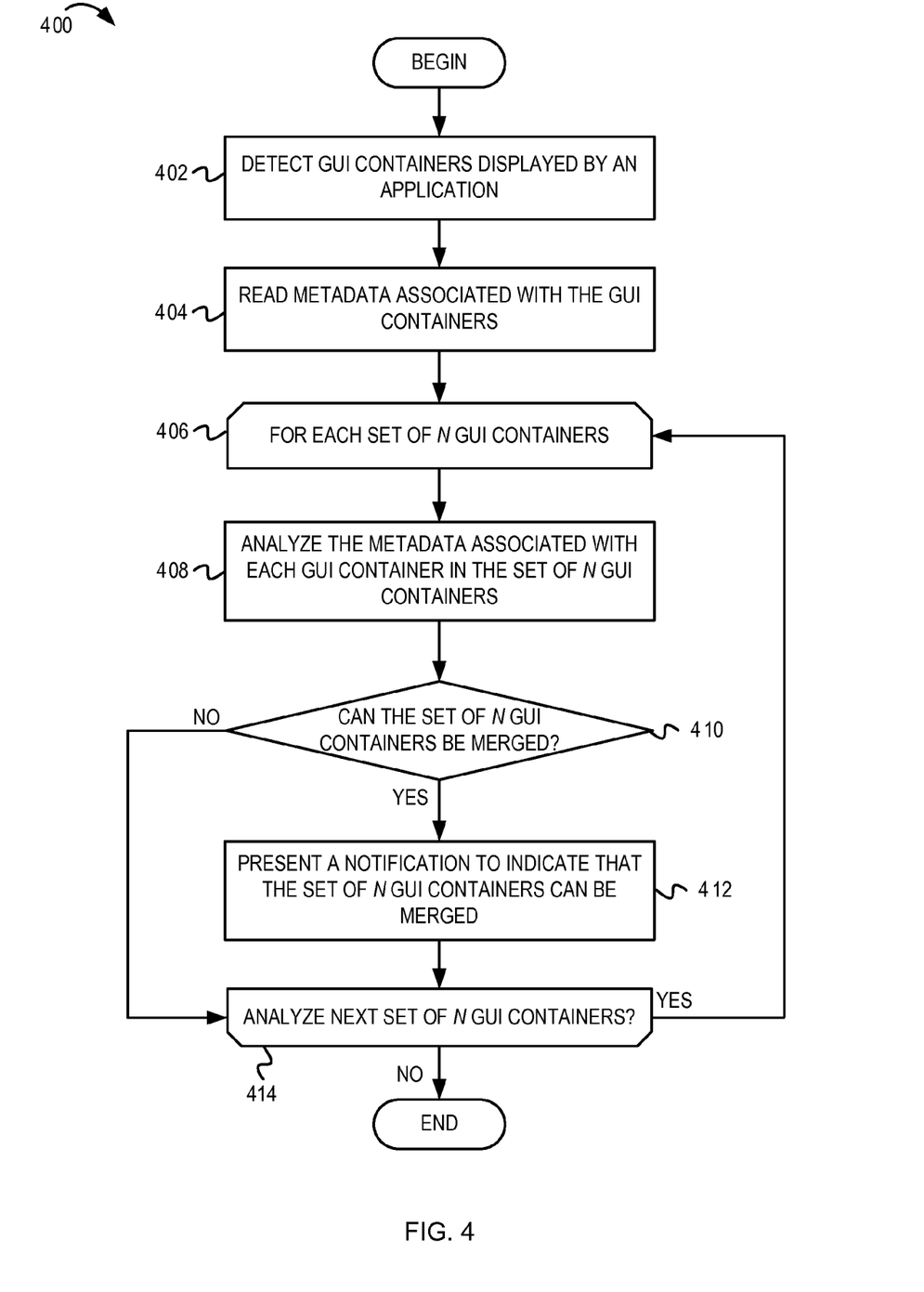
FIG. 4 is an example flow diagram illustrating example operations for determining GUI containers that can be merged.

FIG. 4 is an example flow diagram illustrating example operations for determining GUI containers that can be merged. Flow 400 begins at block 402.

GUI containers displayed by an application are detected (block 402). The GUI containers (e.g., the GUI containers 104 and 110 in FIG. 1) present content (text, images, etc.) and actions for manipulating the content (e.g., clickable links for emailing or editing the content, executing commands, etc). In one implementation, the application that presents the GUI containers can generate a notification when the application executes code to present the GUI containers on a graphical user interface. In another implementation, a background process can monitor the user's actions on the application and/or intercept commands to the application to identify the GUI containers presented by the application. The flow continues at block 404.

Metadata associated with the GUI containers are read (block 404). The metadata may describe content presented by the GUI containers and functionality of actions that operate on the content. The metadata may be associated with the GUI containers to facilitate identification of GUI containers that comprise related content and to facilitate determination of whether the GUI containers can be merged. Embodiments can employ a variety of techniques to indicate metadata associated with the GUI containers. For example, the metadata associated with the GUI containers may be represented in a standard format based on metadata standards, using controlled vocabularies, taxonomies, data dictionaries, etc. As another example, the metadata may be represented using a predefined metadata syntax or any suitable markup language or programming language (e.g., HTML, XML, RDF, etc). As another example, the metadata may be represented in a plain text format in spoken English (or other spoken language) statements. For example, metadata associated with a query tuning problem GUI container may indicate "Problem statement for problem number 10". As another example, metadata associated with a query tuning problem solution GUI container may indicate "Recommended solution for problem number 10". The flow continues at block 406.

A loop begins to perform a set of operations (described in blocks 408-412) on each set of N GUI containers (block 406). The set of operations are performed to determine and take appropriate action if the set of N GUI containers can be merged. The flow continues at block 408.

Metadata associated with each GUI container in the set of N GUI containers is analyzed (block 408). The metadata associated with the GUI container may be compared against the metadata associated with other GUI containers in the set of N GUI containers to determine whether the metadata are similar/related. Embodiments can employ a variety of techniques to analyze the metadata associated with each of the set of N GUI containers. In one implementation, the metadata may be compared to identify a common set of keywords, phrases, combinations of alphanumeric characters, symbols, etc. In other words, the metadata may be analyzed to determine whether the content presented by each GUI container in the set of N GUI containers addresses a common issue. In another implementation, a semantic distance for the set of N GUI containers may be determined. The semantic distance may be a metric that indicates a degree of similarity between the metadata of each GUI container in the set of N GUI containers. The semantic distance may be a number between 0 and 1, where 1 indicates high similarity and 0 indicates little/no similarity. The semantic distance may be determined based on determining and comparing ontologies of various words/phrases in the metadata of each GUI container in the set of N GUI containers. The ontologies may be used to determine whether words/phrases in the metadata have a common root/are related, and to consequently determine the measure of similarity between the words in the metadata. Statistical techniques can also be used to determine the semantic distance for the set of N GUI containers. It should be noted that if metadata associated with the set of N GUI containers is not available, the content displayed by each GUI container in the set of N GUI containers can be analyzed to determine a measure of similarity between the content presented by each GUI container in the set of N GUI containers. The flow continues at block 410.

It is determined whether the set of N GUI containers can be merged (block 410). In determining whether the set of N GUI containers can be merged, it may be determined whether the semantic distance (determined at block 408) is less than a threshold semantic distance. The threshold semantic distance may be determined based on historical analysis of related content to determine a minimum semantic distance between the related content. For example, the threshold semantic distance may be 0.9. In other words, it may be determined that the set of N GUI containers can be merged if there is at least a 90% match between the metadata/content of the set of N GUI containers. As an example, metadata associated with content presented by a first GUI container may indicate that the content is a graphical representation of a company's financial records. The metadata associated with content presented by a second GUI container may indicate that the content is a pie-chart representation of the company's financial records. Based on analyzing the metadata associated with content presented by the first and the second GUI containers, it may be determined that the first and the second GUI containers comprise related content and can therefore be merged. The metadata associated with the set of N GUI containers may be compared against a set of rules to determine whether the set of N GUI containers can be merged. The rules may indicate that GUI containers can be merged if the content presented by the GUI containers address a common issue. For example, the rules may indicate that a GUI container displaying a problem statement can be merged with a GUI container displaying a problem solution if the problem statement and the problem solution are directed to a problem with a common identifier. If it is determined that the set of N GUI containers can be merged, the flow continues at block 412. Otherwise, the flow continues at block 414.

A notification is presented to indicate that the set of N GUI containers can be merged (block 412). Embodiments can employ a variety of techniques to indicate the ability to merge GUI containers. For example, visual notifications may be presented to indicate that the set of N GUI containers can be merged. A color, a font, a border, or other visual element of the set of N GUI containers may be varied to indicate that the set of N GUI containers can be merged. As depicted in FIG. 1, dots on neighboring edges of the GUI containers 104 and 110 may be set to a common predetermined color on determining that the GUI containers 104 and 110 can be merged. As another example, other notifications (e.g., pop-up notifications, lines that connect the GUI containers, etc.) may be presented to indicate that the set of N GUI containers can be merged. As another example, audio notifications (e.g., a pre-recorded message, audio tones, etc.) may be presented to indicate that the set of N GUI containers can be merged. It should also be noted that, in some implementations, multiple notifications (e.g., a combination of audio and visual notifications) may be presented to indicate that the set of N GUI containers can be merged. The flow continues at block 414.

It is determined whether a next set of N GUI containers should be analyzed (block 414). Each set of N GUI containers may be analyzed to identify GUI containers that can be merged. For example, it may be determined the application displays four GUI containers. It may also be determined that N (number of GUI containers that can be merged) is 2. Each set of 2 GUI containers of the four displayed GUI containers may be analyzed at each loop iteration to identify the GUI containers that can be merged. If it is determined that the next set of N GUI containers should be analyzed, the flow continues at block 406, where the next set of N GUI containers is identified and it is determined whether the next set of N GUI containers can be merged. Otherwise, the flow ends.

Figure 5:
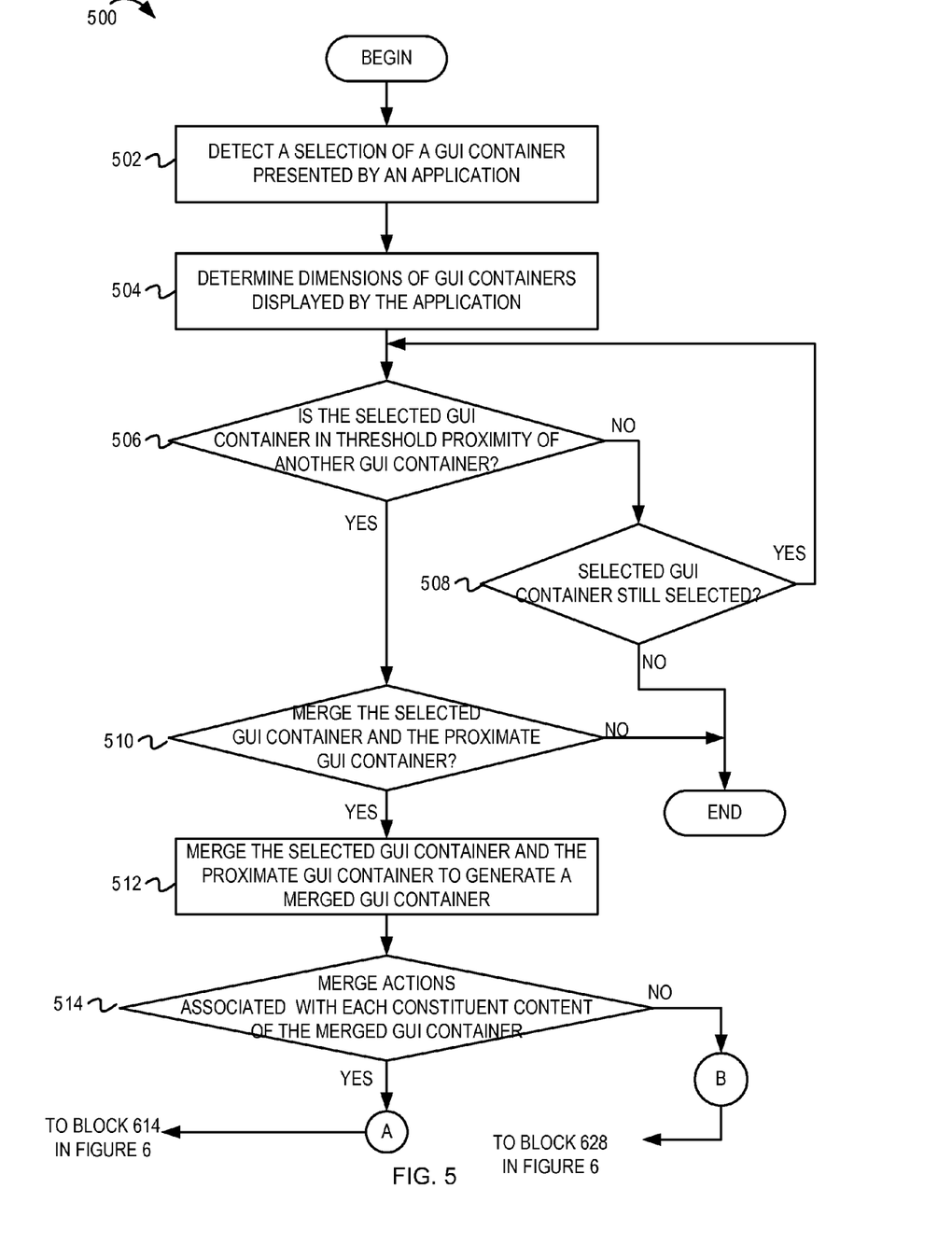
FIG. 5 depicts a flow diagram illustrating example operations for merging GUI containers.
Figure 6:
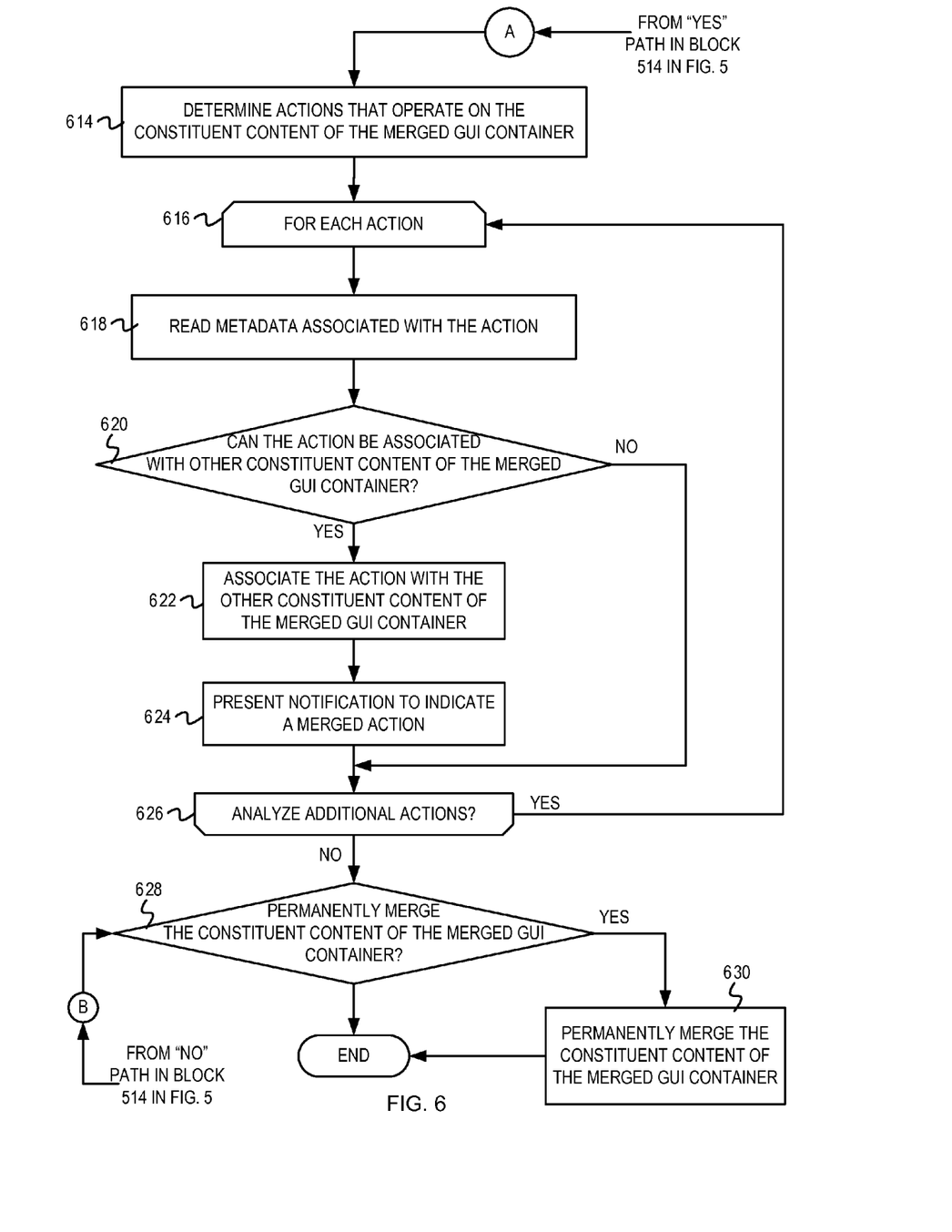
FIG. 6 depicts the flow diagram illustrating example operations for merging GUI containers.

FIG. 5 and FIG. 6 depict a flow diagram illustrating example operations for merging GUI containers. Flow 500 begins at block 502 in FIG. 5.

A selection of a GUI container presented by an application is detected (block 502). As described earlier, various techniques can be implemented to detect the selection of the GUI container. In one implementation, the application may generate a notification to indicate the selection of the GUI container. In another implementation, a background process may monitor user actions and determine the selection of the GUI container. The selection of the GUI container may be detected responsive to detecting any suitable user input (e.g., a mouse click on the GUI container, a keystroke to select the GUI container, a mouse pointer hovering over a link to present the GUI container, an audio command to display the GUI container, etc.). The flow continues at block 504.

Dimensions of all GUI containers displayed by the application are determined (block 504). The GUI containers can comprise panels, layers, views, etc. that may comprise other GUI objects (e.g., textboxes, buttons, clickable links, etc.). Various techniques can be employed to determine the dimensions of the GUI containers displayed by the application. For example, the dimensions of the GUI containers may be determined in the form of a GUI container name and coordinates (e.g., GUI container A is a polygon with coordinates at (5, 5), (20, 5), (10, 10), (3, 15)). As another example, the GUI containers' origin, area, and perimeter may be determined and stored. As another example, the GUI containers' dimensions may be determined with reference to another GUI container or a reference point on the application's graphical user interface. As yet another example, inter-GUI container distances (e.g., distance between the centers of the GUI containers, perimeter-to-perimeter distance, etc.) may also be determined. The flow continues at block 506.

It is determined whether the selected GUI container is in threshold proximity of another GUI container (block 506). The threshold proximity indicates a maximum distance (e.g., in pixels) between two or more GUI containers, which triggers merging of the two or more GUI containers that were determined to comprise related content. As described in FIG. 4, metadata associated with GUI containers may be analyzed to identify the GUI containers with related content. Visual indications may be presented to indicate the GUI containers that comprise the related content and to indicate possible merging of the GUI containers. A GUI analysis and merging unit in the application can determine a distance between perimeters of the selected GUI container and one or more other GUI containers. Alternately, a mathematical barycenter (or geometric center) of the GUI containers can be used as a point to calculate distances between the selected GUI container and the one or more other GUI containers. The GUI analysis and merging unit can then compare the determined distance with the threshold proximity, and can automatically indicate that the GUI containers can be merged if the determined distance is equal to or less than the threshold proximity. In some implementations, if the GUI containers are large in size and overlap with each other, the visual indications may be presented on far edges of the related GUI containers. In other words, if it is determined that GUI containers AA and BB can be merged and that the GUI containers AA and BB overlap with each other, the visual notifications can be presented (as described with reference to block 412 of FIG. 4) on non-overlapping sections of the GUI containers AA and BB. The user may select one of the two GUI containers (e.g., the GUI container AA) and may maneuver the GUI container AA to further overlap with the GUI container BB. The distance between the two GUI containers may be determined as the distance between the visual notifications on the GUI containers AA and BB. As an example, if colored dots are presented, as visual indications, on the non-overlapping sections of the GUI containers AA and BB to indicate possible merging, the distance between the GUI containers AA and BB may be calculated as the distance between the colored dots. The distance between the colored dots can be compared against the threshold proximity and the GUI containers AA and BB can be merged when the distance between the colored dots is less than the threshold proximity. In some implementations, a previous distance between the selected GUI container and the proximate GUI container may be compared against a current distance between the selected GUI container and the proximate GUI container to determine whether the selected and the proximate GUI containers should be merged. For example, if the current distance (e.g., 50 pixels) between the GUI containers is less than the previous distance (e.g., 75 pixels) between the GUI containers, it may be determined that the GUI containers should be merged. If it is determined that the selected GUI container is in threshold proximity of another GUI container ("proximate GUI container"), the flow continues at block 510. Otherwise, the flow continues at block 508.

It is determined whether the selected GUI container is still selected (block 508). The flow 500 moves from block 506 to block 508 on determining that the selected GUI container is not within threshold proximity of another GUI container. If it is determined that the selected GUI container is still selected, the flow loops back to block 506, where it is determined whether the selected GUI container is within threshold proximity of another GUI container. If it is determined that the selected GUI container is no longer selected, the flow ends.

It is determined whether the selected GUI container and the proximate GUI container should be merged (block 510). The flow 500 moves from block 506 to block 510 on determining that the selected GUI container is within threshold proximity of another GUI container. In determining whether the selected GUI container and the proximate GUI container should be merged, it may be verified whether the selected GUI container and the proximate GUI container comprise related content. For example, a temporary structure comprising a list of presented GUI containers with related content may be accessed to determine whether the selected GUI container and the proximate GUI container can be merged. On verifying that the selected and the proximate GUI containers can be merged, embodiments can employ various techniques to request/receive user input that indicates whether the selected GUI container and the proximate GUI container should be merged. Example techniques include displaying clickable notifications, displaying instructions for merging the GUI containers, etc. For example, responsive to the user clicking on a "merge the GUI containers" button or speaking a command to merge the GUI containers, it may be determined that the selected GUI container and the proximate GUI container should be merged. As another example, responsive to the user moving the selected GUI container to touch/overlap the proximate GUI container, it may be determined that the selected GUI container and the proximate GUI container should be merged. As described above, in some implementations, proximate edges of the selected GUI container and the proximate GUI container may already be within the threshold distance and/or may overlap with each other. The GUI containers may be merged on detecting that the user has maneuvered the selected GUI container such that previously non-overlapping sections of the selected and the proximate GUI containers now overlap with each other. In some implementations, responsive to the user moving the selected GUI container such that the distance between the selected GUI container and the proximate GUI container is greater than a disconnect threshold distance, it may be determined that the selected GUI container and the proximate GUI container should not be merged. If it is determined that the selected GUI container and the proximate GUI container should be merged, the flow continues at block 512. Otherwise, the flow ends.

The selected GUI container and the proximate GUI container are merged to generate a merged GUI container (block 512). The merged GUI container presents merged content. Constituent content of the merged GUI container correspond to content presented by the GUI containers that are merged to form the merged GUI container. For example, one constituent content of the merged GUI container corresponds to content formerly presented by the selected GUI container. Another constituent content of the merged GUI container corresponds to content formerly presented by the proximate GUI container. The constituent content of the merged GUI container can be navigated (moved around a display device, minimized, resized, closed, etc.) as a single unit. Additionally, actions (e.g., operations to edit, email, etc.) that individually operate on each constituent content of the merged GUI container can also be reconfigured (if possible) to operate on other constituent content of the merged GUI container as will be described in FIG. 6. The flow continues at block 514.

It is determined whether actions that operate on each constituent content of the merged GUI container should be merged (block 514). For example, the user may be prompted to indicate whether the actions that operate on each constituent content of the merged GUI container should be merged (if possible). If it is determined that the actions that operate on each constituent content of the merged GUI container should be merged, the flow continues at block 614 in FIG. 6. Otherwise, the flow continues at block 628 in FIG. 6. It should be noted that in some implementations, the actions may automatically be merged (if possible) and the user may not have an option of indicating whether the actions should be merged.

The actions that operate on the constituent content of the merged GUI container are determined (block 614). It may be determined (e.g., based on analyzing code which when executed presents the constituent content of the merged GUI container) that an email action, when invoked, operates on a first constituent content of the merged GUI container and that a run action, when invoked, operates on a second constituent content of the merged GUI container. In the example of FIG. 1, invoking the email action (e.g., by clicking on the email action link 105) presented within the GUI container 104 by the graphical user interface 102A causes the application to email the content 106. The flow continues at block 616.

A loop begins for each action determined at block 614 (block 616). Operations for determining metadata associated with the action, determining whether the action can be associated with other constituent content of the merged GUI container (as will be described in blocks 618-626) are performed for each action. The flow continues at block 618.

Metadata associated with the action is read (block 618). The metadata may describe content (e.g., types of content, types of GUI objects, etc.) on which the action can operate. For example, the metadata associated with the action may indicate that the action can operate on text fields but not on images. As another example, the metadata associated with the email action may indicate that the email action can operate on text and images (i.e., selecting an email action link will cause text and images to be emailed). As another example, the metadata associated with the run action may indicate that the run action can only execute commands. As described above, embodiments can use a variety of techniques to represent metadata associated with the GUI containers. Example techniques include using standard metadata formats (e.g., using a predetermined vocabulary), using a programming language (e.g., HTML, XML, RDF), inserting the metadata as plain text comments, etc. For example, metadata associated with the run action may indicate, "execute commands displayed by a GUI container". The flow continues at block 620.

It is determined whether the action that operates on a first constituent content of the merged GUI container can be associated with the other constituent content of the merged GUI container (block 620). The metadata associated with the action that operates on the first constituent content of the merged GUI container can be compared against metadata associated with the other constituent content of the merged GUI container. With reference to FIG. 2, the action metadata 109, associated with the email action link 105, may be compared against the content metadata 108 and 114. Embodiments can employ a variety of techniques to determine whether the action can be associated with the constituent content of the merged GUI container. For example, a common set of words (phrases, combination of symbols, numbers, etc.) and/or similar words may be determined. As another example, a number of common/similar keywords/semantic distance between the metadata associated with the action that operates on the first constituent content of the merged GUI container and the metadata associated with the other constituent content of the merged GUI container may be determined. The action can be designated as a merged action (i.e., associated with the other constituent content of the merged GUI container) if the number of common/similar keywords is greater than a threshold (or if the semantic distance is greater than a threshold semantic distance). As another example, the type of content on which the action can operate may be compared against datatypes associated with the other constituent content of the merged GUI container. For example, it may be determined that an edit action can operate on text fields. It may also be determined that the first constituent content of the merged GUI container comprises text fields while a second constituent content of the merged GUI container comprises image fields. Because the edit action does not operate on the image fields in the second constituent content of the merged GUI container, it may be determined that the edit action cannot be associated with the second constituent content of the merged GUI container. If it is determined that the action that operates on the first constituent content of the merged GUI container can be associated with the other constituent content of the merged GUI container, the flow continues at block 622. Otherwise, the flow continues at block 626.

The action is associated with the other constituent content of the merged GUI container (block 622). Code associated with the action may be reconfigured so that the action (when selected) operates on the other constituent content of the merged GUI container. Reconfiguring the code associated with the action can comprise redefining objects in the code, redefining parameters provided to functions, etc. Reconfiguring the code associated with the action may also comprise disabling existing code associated with the action and generating new code that operates on more than one constituent content of the merged GUI container. For example, operations associated with a merged email action may be reconfigured so that all the constituent content of the merged GUI container are emailed on detecting selection of an email action link. As another example, the operations associated with a merged edit action may be reconfigured so that all the constituent content of the merged GUI container can be edited on detecting a selection of an edit action link. The edit action may be reconfigured so that multiple editing interfaces are presented on detecting a selection of the edit action link. Each of the multiple editing interfaces may enable a user to edit corresponding constituent content of the merged GUI container. Alternately, the merged edit action may be reconfigured so that a single editing interface is presented on detecting the selection of the edit action link. The single editing interface may enable the user to simultaneously edit all the constituent content of the merged GUI container. For example, on selecting a "bold" font on the editing interface, a command may be generated to edit each constituent content of the merged GUI container. The flow continues at block 624.

A notification is presented to indicate the merged action for the constituent content of the merged GUI container (block 624). Embodiments can employ a variety of techniques for indicating the merged actions. For example, the merged actions may be represented on the application's graphical user interface using one set of visual indications. Other actions that cannot be associated with all constituent content of the merged GUI container ("non-merged actions") may be represented using a second set of visual indications. In other words, a color, a font size, or other visual effects may be varied depending on whether or not the action is a merged action. Referring to the example of FIG. 2, the email action represented by the link 126 is a merged action. This is represented by shaded block encapsulating the email action link 126. The run action represented by the link 111 is not a merged action and this is represented by presenting an underline effect for the run action link 111. As another example, various other notifications (e.g., a pop-up window responsive to a selection tool hovering over the action links) may be presented to indicate whether the action is a merged action. As another example, audio notifications (e.g., audio tones) may be presented to indicate whether the action is a merged action. It should also be noted that in some implementations, notifications for indicating merged actions may not be presented. The flow continues at block 626.

It is determined whether there exist additional actions to be analyzed (block 626). Each action associated with each constituent content of the merged GUI container may be analyzed to determine if the action can be associated with other constituent content of the merged GUI container. If it is determined that there exist additional actions to be analyzed, the flow continues at block 616, where a next action is identified and metadata associated with the action is analyzed as described with reference to blocks 618-624. Otherwise, the flow continues at block 628.

It is determined whether the constituent content of the merged GUI container should be permanently merged (block 628). The flow 500 also moves from the "no" path from block 514 in FIG. 5 to block 628 in FIG. 6 on determining that the actions associated with each constituent content of the merged GUI container should not be analyzed/merged. In one implementation, the user may be prompted to indicate whether the constituent content of the merged GUI container should be temporarily merged or permanently merged. With reference to the graphical user interface 102D of FIG. 2, the user may click on the arrows 122 to indicate that the constituent content 106 and 112 of the merged GUI container 158 should be permanently merged. If it is determined that the constituent content of the merged GUI container should be permanently merged, the flow continues at block 630. Otherwise, the flow ends.

The constituent content of the merged GUI container are permanently merged (block 630). By choosing to permanently merge the constituent content of the merged GUI container, provisions for disassociating the constituent content of the merged GUI container are removed. Permanently merging the constituent content of the merged GUI container can comprise disabling code associated with re-generating the selected and the proximate GUI containers with their respective content and their respective actions from the merged GUI container. Permanently merging the constituent content of the merged GUI container can comprise removing visual elements for disassociating the constituent content of the merged GUI container, presenting the constituents of the merged GUI container in a single GUI container, etc. Permanently merging the constituent content of the merged GUI container can be particularly useful in webpage building applications, where the GUI containers that constitute a webpage may be permanently merged to preserve the structure of the webpage. From block 630, the flow ends.

It should be noted that the operations described in FIGS. 1-6 are examples meant to aid in understanding embodiments, and should not be used to limit embodiments or limit scope of the claims. Embodiments may perform additional operations, fewer operations, operations in a different order, operations in parallel, and some operations differently. For example, once GUI containers are merged, the user may also have an option for disassociating the constituent content of the merged GUI container. With reference to the graphical user interface 102D of FIG. 2, the user may click on arrows 120 to indicate that the merged GUI container 158 should be disassociated to form the GUI containers 104 and 110. Moreover, code associated with merged actions may also be reconfigured so that the actions operate only on the content with which they were originally associated. For example, the code associated with the email action link 126 may be reconfigured so that the email action operates only on the content 106.

It should also be noted that although FIGS. 1-6 describe operations for merging GUI containers displayed by legacy applications, and actions that operate on constituent content of the merged GUI container, embodiments are not so limited. Operations for merging GUI containers as described herein can also be applied in the design of webpages and in mashup environments. For example, a programmer can create separate GUI containers for each segment of content to be displayed on the webpage. During a webpage building process, the GUI analysis and merging unit 150 can analyze metadata/content associated each of the GUI containers and identify and indicate GUI containers that comprise related content. The programmer can determine which GUI containers should be merged, whether the GUI containers should be merged, etc., and can accordingly build web or desktop applications, software, etc. The programmer can also indicate to the GUI analysis and merging unit 150 that the constituent content of the merged GUI container should be permanently merged to preserve structure of the webpage.

It should also be noted that although FIGS. 1-6 describe operations for merging GUI containers displayed by a single application, embodiments are not so limited. In some implementations, the GUI analysis and merging unit 150 may be implemented at an operating system level. The GUI analysis and merging unit 150 may keep track of GUI containers displayed by multiple applications, analyze metadata/content associated with each of the GUI containers, and identify GUI containers that can be merged. For example, the GUI analysis and merging unit 150 may determine that a graphing application displays a GUI container comprising graphs for a particular scenario and that a spreadsheet application displays a GUI container comprising statistics for the same scenario. The GUI analysis and merging unit 150 can indicate that the GUI container displayed by the graphing application can be merged with the GUI container displayed by the spreadsheet application.

Although FIGS. 1-6 describe the GUI analysis and merging unit 150 identifying GUI containers that can be merged prior to the user selecting and moving the GUI containers, embodiments are not so limited. In some implementations, on detecting a selection of a GUI container, the GUI analysis and merging unit 150 can identify (if possible) other GUI containers that can be merged with the selected GUI container. For example, the GUI analysis and merging unit 150 may identify GUI containers within threshold distance (e.g., a physical distance, a semantic distance, etc.) of the selected GUI container and may determine whether the GUI containers within the threshold distance can be merged with the selected GUI container.

In some implementations, after the GUI containers have been merged and the actions that operate on constituent content of the merged GUI container have been merged (if possible), an indication of the constituent content of the merged GUI container and the merged actions may be stored. The type of merge (e.g., permanent or temporary) may also be stored. When the application is launched again, the GUI analysis and merging unit 150 may determine whether the GUI containers displayed by the application are part of a list of previously merged GUI containers. If so, the GUI analysis and merging unit 150 can appropriately merge the GUI containers based on stored indications in the list of previously merged GUI containers.

Lastly it is noted that although FIGS. 1-6 describe operations for merging GUI containers on determining that the GUI containers comprise related content, embodiments are not so limited. In some implementations, on determining that the GUI containers comprise related content, the GUI containers may be repelled, deleted, integrated, etc. For example, on determining that the GUI containers comprise related content, the GUI containers may be moved to opposite ends of a display unit. As another example, on determining that the GUI containers comprise related content and are within a threshold distance of each other, one or both of the GUI containers may be deleted. For example, in a video gaming environment, it may be determined that two GUI elements are related. A player may select one of the GUI elements and maneuver the selected GUI element to be within threshold proximity of the other (proximate) GUI element to delete the proximate GUI element.

As will be appreciated by one skilled in the art, aspects of the present inventive subject matter may be embodied as a system, method, or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 7:
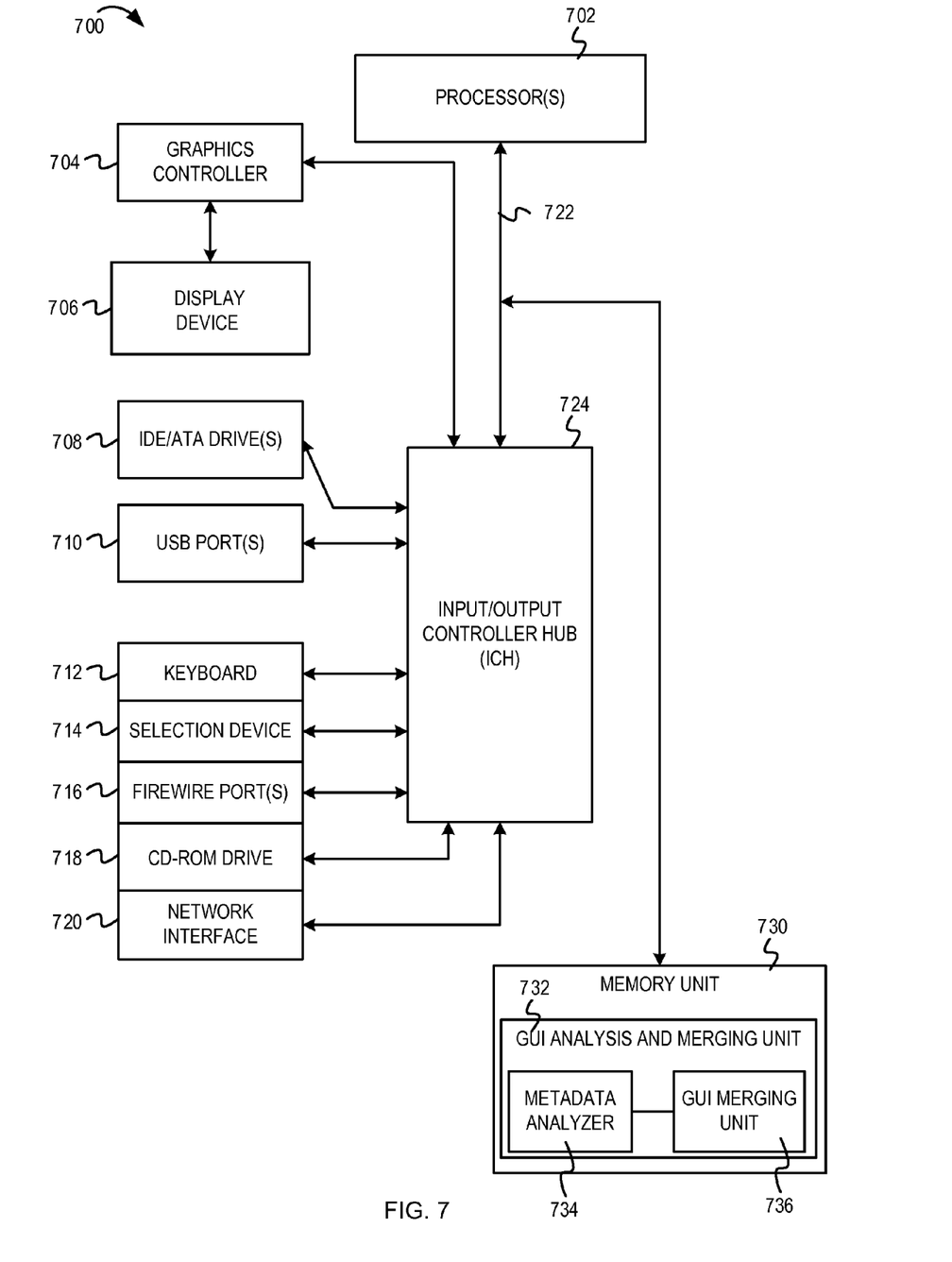
FIG. 7 is an example computer system configured for dynamically identification GUI containers that can be merged.

FIG. 7 is an example computer system configured for dynamically identification GUI containers that can be merged. The computer system 700 includes a processor 702. The processor 702 is connected to an input/output controller hub 724 (ICH), also known as a south bridge, via a bus 722 (e.g., PCI, ISA, PCI-Express, HyperTransport, etc). A memory unit 730 interfaces with the processor 702 and the ICH 724. The main memory unit 730 can include any suitable random access memory (RAM), such as static RAM, dynamic RAM, synchronous dynamic RAM, extended data output RAM, etc The memory unit 730 comprises a GUI analysis and merging unit 732. The GUI analysis and merging unit 732 comprises a metadata analyzer 734 coupled with a GUI merging unit 736. As described with reference to FIGS. 1-6, the GUI analysis and merging unit 732 implements functionality to identify GUI containers displayed by an application. The metadata analyzer 734 can analyze metadata associated with and/or content displayed by the GUI containers and can determine whether two or more of the GUI containers comprise related content. The GUI merging unit 738 can present a notification to indicate the GUI containers that can be merged. The GUI merging unit 738 can merge the GUI containers responsive to a user input. Additionally, the metadata analyzer 734 can also identify actions that operate on constituent content of the GUI containers and determine (e.g., based on comparing action metadata) whether one or more of the actions can be associated with other constituent content of the merged GUI container. If so, the GUI merging unit 738 can merge actions and can reconfigure operations associated with the merged actions so that the merged actions operate on the other constituent content of the merged GUI container.

The ICH 724 connects and controls peripheral devices. In FIG. 7, the ICH 724 is connected to IDE/ATA drives 708 and to universal serial bus (USB) ports 710. The ICH 724 may also be connected to a keyboard 712, a selection device 714, firewire ports 716, CD-ROM drive 718, and a network interface 720. The ICH 724 can also be connected to a graphics controller 704. The graphics controller 704 is connected to a display device 706 (e.g., monitor). In some embodiments, the computer system 700 can include additional devices and/or more than one of each component shown in FIG. 7 (e.g., video cards, audio cards, peripheral devices, etc.). For example, in some instances, the computer system 700 may include multiple processors, multiple cores, multiple external CPU's. In other instances, components may be integrated or subdivided. Any one of these functionalities may be partially (or entirely) implemented in hardware and/or on the processor 702. For example, the functionality may be implemented with an application specific integrated circuit, in logic implemented in the processor 702, in a co-processor on a peripheral device or card, etc.

While the embodiments are described with reference to various implementations and exploitations, it will be understood that these embodiments are illustrative and that the scope of the inventive subject matter is not limited to them. In general, techniques for user interface manipulation for coherent content presentation as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   determining, by a processor, that a first content presented by a first graphical user interface container is related to a second content presented by a second graphical user interface container;
   merging the first graphical user interface container and the second graphical user interface container to generate a merged container that presents a merged content based, at least in part, on said determining that the first content presented by the first graphical user interface container is related to the second content presented by the second graphical user interface container, wherein the merged content comprises a first constituent content of the merged container that corresponds to the first content and a second constituent content of the merged container that corresponds to the second content;
   comparing metadata that corresponds to a first action associated with the first constituent content with metadata that corresponds to the second constituent content, wherein the first action operates on the first constituent content when invoked;
   determining that the first action associated with the first constituent content can be reconfigured to operate upon the first constituent content and the second constituent content of the merged container based, at least in part, on said comparing the metadata that corresponds to the first action with metadata that corresponds to the second constituent content; and
   reconfiguring computer program code that implements the first action to operate upon the first and the second constituent content of the merged container responsive to said determining that the first action associated with the first constituent content can operate upon the second constituent content.

2. The method of claim 1 further comprising:
   detecting a selection of the first action; and
   executing the reconfigured computer program code to perform the first action on the first and the second constituent content of the merged container.

3. The method of claim 1, wherein said determining that the first content presented by the first graphical user interface container is related to the second content presented by the second graphical user interface container comprises at least one of analyzing metadata associated with each of a plurality of the graphical user interface containers and analyzing content associated with each of the plurality of the graphical user interface containers, wherein the plurality of graphical user interface containers comprises the first graphical user interface container and the second graphical user interface container.

4. The method of claim 1, wherein said determining that the first content presented by the first graphical user interface container is related to the second content presented by the second graphical user interface container comprises:
   determining that a semantic distance between the first graphical user interface container and the second graphical user interface container is greater than a semantic distance threshold, wherein the semantic distance indicates a measure of similarity between metadata associated with the first graphical user interface container and metadata associated with the second graphical user interface container; and
   presenting a notification indicating that the first graphical user interface container can be merged with the second graphical user interface container.

5. The method of claim 1, comprising:
based on a user input, determining that the first and the second constituent content of the merged container should be permanently merged; and
removing an ability to disassociate the first and the second constituent content of the merged container to re-create the first graphical user interface container and the second graphical user interface container.

6. The method of claim 1, wherein said merging the first graphical user interface container and the second graphical user interface container to generate the merged container that presents the merged content comprises:
detecting a selection of the first graphical user interface container;
detecting a movement of the first graphical user interface container;
detecting that a distance between the first graphical user interface container and the second graphical user interface container is less than a threshold; and
associating the first graphical user interface container with the second graphical user interface container based, at least in part, on said detecting that the distance between the first graphical user interface container and the second graphical user interface container is less than the threshold.

7. The method of claim 6, wherein said detecting that the distance between the first graphical user interface container and the second graphical user interface container is less than the threshold comprises at least one of determining that a first semantic distance between metadata associated with the first graphical user interface container and metadata associated with the second graphical user interface container is greater than a semantic threshold, determining that a second semantic distance between the first content and the second content is greater than the semantic threshold, and determining that a physical distance between the first graphical user interface container and the second graphical user interface container is less than a threshold distance.

8. The method of claim 6, wherein said associating the first graphical user interface container with the second graphical user interface container comprises coupling the first graphical user interface container and the second graphical user interface container for combined navigation of the first content and the second content.

9. The method of claim 1, comprising recording said merging the first graphical user interface container and the second graphical user interface container.

10. The method of claim 1, further comprising:
determining that a third content presented by a third graphical user interface container is related to a fourth content presented by a fourth graphical user interface container; and
in response to said determining that the third content is related to the fourth content,
repelling the third graphical user interface container that presents the third content and the fourth graphical user interface container that presents the fourth content so that the third graphical user interface container and the fourth graphical user interface container are separated from each other by at least a threshold distance, or
deleting the third graphical user interface container and the fourth graphical user interface container.

11. A method comprising:
analyzing a first graphical user interface container and a second graphical user interface container, wherein the first graphical user interface container presents first content and the second graphical user interface container presents second content;
determining, by a processor, that the first graphical user interface container can be merged with the second graphical user interface container based, at least in part, on said analyzing the first graphical user interface container and the second graphical user interface container;
merging the first graphical user interface container and the second graphical user interface container to generate a merged container that presents a merged content, wherein the merged content comprises a first constituent content that corresponds to the first content and comprises a second constituent content that corresponds to the second content;
comparing metadata that corresponds to a first action associated with the first constituent content with metadata that corresponds to the second constituent content, wherein the first action operates on the first constituent content when invoked;
determining that the first action associated with the first constituent content can operate upon the second constituent content based, at least in part, on said comparing the metadata that corresponds to the first action with metadata that corresponds to the second constituent content;
associating the first action with the second constituent content, based on said determining that the first action associated with the first constituent content can operate upon the second constituent content;
detecting a selection of the first action; and
executing the first action so that the first action operates on the first constituent content and the second constituent content.

12. The method of claim 11, wherein said associating the first action with the second constituent content comprises reconfiguring computer program code that implements the first action to operate upon the first constituent content and the second constituent content.

13. The method of claim 12, wherein said executing the first action so that the first action operates on the first constituent content and the second constituent content comprises executing the reconfigured computer program code to perform the first action on the first and the second constituent content of the merged container.

14. A computer program product for user interface manipulation for coherent content presentation, the computer program product comprising:
a computer readable storage medium having computer readable program code embodied therewith, the computer readable program code configured to,
determine that a first content presented by a first graphical user interface container is related to a second content presented by a second graphical user interface container;
merge the first graphical user interface container and the second graphical user interface container to generate a merged container that presents a merged content based, at least in part, on the computer readable program code determining that the first content presented by the first graphical user interface container is related to the second content presented by the second graphical user interface container, wherein the merged content comprises a first constituent content of the merged container that corresponds to the first content and a second constituent content of the merged container that corresponds to the second content;

compare metadata that corresponds to a first action associated with the first constituent content with metadata that corresponds to the second constituent content, wherein the first action operates on the first constituent content when invoked;

determine that the first action associated with the first constituent content can be reconfigured to operate upon the first constituent content and the second constituent content of the merged container based, at least in part, on said comparing the metadata that corresponds to the first action with metadata that corresponds to the second constituent content; and reconfigure computer program code that implements the first action to operate upon the first and the second constituent content of the merged container responsive to the computer readable program code determining that the first action associated with the first constituent content can operate upon the second constituent content.

15. The computer program product of claim 14, wherein the computer readable program code is further configured to:
   detect a selection of the first action; and
   execute the reconfigured computer program code to perform the first action on the first and the second constituent content of the merged container.

16. The computer program product of claim 14, wherein the computer readable program code configured to determine that the first content presented by the first graphical user interface container is related to the second content presented by the second graphical user interface container comprises at least one of the computer readable program code configured to analyze metadata associated with each of a plurality of the graphical user interface containers and the computer readable program code configured to analyze content associated with each of the plurality of the graphical user interface containers, wherein the plurality of graphical user interface containers comprises the first graphical user container and the second graphical user interface container.

17. The computer program product of claim 14, wherein the computer readable program code configured to merge the first graphical user interface container and the second graphical user interface container to generate the merged container that presents the merged content comprises the computer readable program code configured to:
   detect a selection of the first graphical user interface container;
   detect a movement of the first graphical user interface container;
   detect that a distance between the first graphical user interface container and the second graphical user interface container is less than a threshold; and
   associate the first graphical user interface container with the second graphical user interface container based, at least in part, on the computer readable program code detecting that the distance between the first graphical user interface container and the second graphical user interface container is less than the threshold.

18. An apparatus comprising:
   a processor;
   a network interface coupled with the processor; and
   a metadata analyzer operable to,
      determine that a first content presented by a first graphical user interface container is related to a second content presented by a second graphical user interface container;
   a graphical user interface container merging unit operable to,
      merge the first graphical user interface container and the second graphical user interface container to generate a merged container that presents a merged content based, at least in part, on the metadata analyzer determining that the first content presented by the first graphical user interface container is related to the second content presented by the second graphical user interface container, wherein the merged content comprises a first constituent content of the merged container that corresponds to the first content and a second constituent content of the merged container that corresponds to the second content;
   the metadata analyzer further operable to,
      compare metadata that corresponds to a first action associated with the first constituent content with metadata that corresponds to the second constituent content, wherein the first action operates on the first constituent content when invoked;
      determine that the first action associated with the first constituent content can be reconfigured to operate upon the first constituent content and the second constituent content of the merged container based, at least in part, on the metadata analyzer comparing the metadata that corresponds to the first action with metadata that corresponds to the second constituent content; and
   the graphical user interface container merging unit further operable to,
      reconfigure computer program code that implements the first action to operate upon the first and the second constituent content of the merged container responsive to the metadata analyzer determining that the first action associated with the first constituent content can operate upon the second constituent content.

19. The apparatus of claim 18, wherein the metadata analyzer and the graphical user interface container merging unit comprise computer readable storage media.

* * * * *